(12) United States Patent
Pelagotti et al.

(10) Patent No.: US 11,125,494 B2
(45) Date of Patent: Sep. 21, 2021

(54) METHOD FOR STARTING AND OPERATING A PLANT FOR THE LIQUEFACTION OF A GASEOUS PRODUCT

(71) Applicant: Nuovo Pignone Tecnologie Srl, Florence (IT)

(72) Inventors: Antonio Pelagotti, Florence (IT); Annunzio Lazzari, Florence (IT); Andrea Alfani, Florence (IT); Oriano Zucchi, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 83 days.

(21) Appl. No.: 15/746,701

(22) PCT Filed: Jul. 21, 2016

(86) PCT No.: PCT/EP2016/067422
§ 371 (c)(1),
(2) Date: Jan. 22, 2018

(87) PCT Pub. No.: WO2017/013213
PCT Pub. Date: Jan. 26, 2017

(65) Prior Publication Data
US 2018/0216879 A1 Aug. 2, 2018

(30) Foreign Application Priority Data
Jul. 22, 2015 (IT) .................... 102015000036886

(51) Int. Cl.
*F25J 1/02* (2006.01)
*F25J 1/00* (2006.01)
(Continued)

(52) U.S. Cl.
CPC ............... *F25J 1/023* (2013.01); *F25B 1/00* (2013.01); *F25B 1/053* (2013.01); *F25J 1/0022* (2013.01);
(Continued)

(58) Field of Classification Search
CPC ........ F25J 1/00; F25J 1/02; F25J 1/023; F25J 1/0022; F25J 1/0042; F25J 1/0284; F25J 1/0289
See application file for complete search history.

(56) References Cited

U.S. PATENT DOCUMENTS

| 6,640,586 B1 | 11/2003 | Baudat et al. |
| 8,381,617 B2 | 2/2013 | Holt et al. |
| 2013/0119666 A1 | 5/2013 | Holt et al. |

FOREIGN PATENT DOCUMENTS

| EP | 2478311 A1 * | 7/2012 | ............. F01D 15/04 |
| JP | 2006504928 A | 2/2006 | |

(Continued)

OTHER PUBLICATIONS

Italian Search Report and Written Opinion issued in connection with corresponding IT Application No. 102015000036886 dated Apr. 13, 2016.

(Continued)

*Primary Examiner* — Craig Kim
(74) *Attorney, Agent, or Firm* — Baker Hughes Patent Organization

(57) ABSTRACT

A method for starting and operating a plant for the liquefaction of a gaseous product comprising the steps of electrically connecting a variable frequency drive to a motor of a first machine string; increasing the speed of the motor of the first machine string up until a first predefined threshold; electrically disconnecting the variable frequency drive from the motor of the first machine string; electrically connecting (Continued)

the variable frequency drive to a motor of a second machine string; the first predefined threshold is function of said frequency of the power supply grid. The variable frequency drive can be switched during operation of the plant among the strings according to process requirements.

17 Claims, 2 Drawing Sheets

(51) Int. Cl.
    *F25B 1/00*         (2006.01)
    *F25B 1/053*      (2006.01)
    *F02C 3/045*      (2006.01)

(52) U.S. Cl.
    CPC ........... *F25J 1/0042* (2013.01); *F25J 1/0284* (2013.01); *F25J 1/0298* (2013.01); *F02C 3/045* (2013.01); *F05B 2210/11* (2013.01); *F25J 1/0247* (2013.01); *F25J 1/0263* (2013.01); *F25J 2280/10* (2013.01)

(56) References Cited

FOREIGN PATENT DOCUMENTS

| | | |
|---|---|---|
| JP | 2009529117 A | 8/2009 |
| WO | 2011/032958 A1 | 3/2011 |
| WO | 2014/072433 A1 | 5/2014 |

OTHER PUBLICATIONS

International Search Report and Written Opinion issued in connection with corresponding PCT Application No. PCT/EP2016/067422 dated Oct. 20, 2016.

* cited by examiner

METHOD FOR STARTING AND OPERATING A PLANT FOR THE LIQUEFACTION OF A GASEOUS PRODUCT

BACKGROUND OF THE INVENTION

The subject matter of the present disclosure relates to a method for starting and operating a plant for the liquefaction of a gaseous product. In an embodiment, the gaseous product is a hydrocarbon or a hydrocarbon mix. More particularly the liquid product is natural gas.

Natural gas is becoming an increasingly important source of energy. In order to allow transportation of the natural gas from the source of supply to the place of use, the volume of the gas must be reduced. Cryogenic liquefaction has become a routinely practiced process for converting the natural gas into a liquid, which is more convenient, less expensive and safer to store and transport. Transportation by ship vessels of liquefied natural gas (LNG) becomes possible at ambient pressure, by keeping the chilled and liquefied gas at a temperature lower than liquefaction temperature at ambient pressure.

In order to store and transport natural gas in the liquid state, the natural gas is in an embodiment cooled at around −150 to −170° C., where the gas possesses a nearly atmospheric vapor pressure.

Several processes and systems exist in the prior art for the liquefaction of natural gas, which provide for sequentially passing the natural gas at an elevated pressure through a plurality of cooling stage/s whereupon the gas is cooled in successively lower temperatures in refrigeration cycle/s until the liquefaction temperature is achieved.

Prior to passing the natural gas through the cooling stage/s, the natural gas is pre-treated to remove any impurities that can interfere the processing, damage the machinery or are undesired in the final product. Impurities include acid gases, sulfur compounds, carbon dioxide, mercaptans, water and mercury. The pre-treated gas from which impurities have been removed is then cooled by refrigerant streams to separate heavier hydrocarbons. The remaining gas mainly consists of methane and usually contains less than 0.1% mol of hydrocarbons of higher molecular weight, such as propane or heavier hydrocarbons. The thus cleaned and purified natural gas is cooled down to the final temperature in a cryogenic section. The resulting LNG can be stored and transported at nearly atmospheric pressure.

Large Cryogenic liquefaction is usually performed by means of a multi-cycle process, i.e. a process using different refrigeration cycles. Depending upon the kind of process, each cycle can use a different refrigerating fluid, or else the same refrigerating fluid can be used in two or more cycles.

With more detail, small to medium scale liquefaction technologies can be divided into two main groups:

Mixed refrigerant (MR) technologies: these are "condensing-type" processes, where the refrigerant used for the liquefaction makes use of its latent heat of vaporization to cool the natural gas.

Expansion-based technologies: these are processes where the refrigerant is always in gas phase and only makes use of its sensible heat to cool the natural gas.

In the state of the art, the production of LNG is performed in a dedicated plant, in which the natural gas is progressively cooled during a refrigeration process. Indeed, the plant comprises several heat exchangers in which the natural gas transfers heat to a refrigerating fluid.

With more detail, the refrigerating fluid is circulated by a pump or a set of pumps (for the liquid phase) and compressor or a set of compressors (for the vapor phase). A group of pumps and/or compressors attached to the same shaft is called a "string" in the technical field.

A string also comprises one or more power unit. Typically, a string is powered by a turbine and, optionally, by an electrical helper motor. In a so-called E-LNG plant, the power unit of each string comprises just a single electric motor. In this case, the motor can be either employed at a fixed speed, or can be employed at a variable speed. In this case, the motor is powered by a variable frequency drive (VFD). With more detail, a variable-frequency drive is a type of adjustable-speed drive used in electro-mechanical drive systems to control alternate current (AC) motor speed and torque by varying motor input frequency and voltage.

A plant comprises a variable number of the above described strings, but normally there are at least two strings in each plant. In the following disclosure a plant is assumed to comprise two strings for ease of description, however no loss of generality is intended, since the same concepts can be readily extended to a plant with more than two strings.

In the prior art, starting the plant is done by gradually powering up each motor. Therefore, each motor has to be provided with its own variable frequency drive, even if it is then employed at constant speed.

In order to partially solve this problem, electrical motors can be powered up with a soft starter when the required power is not very high. For example, a soft starter can consist of mechanical or electrical devices, or a combination of both. Mechanical soft starters include clutches and several types of couplings using a fluid, magnetic forces, or steel shot to transmit torque, similar to other forms of torque limiter. Electrical soft starters can be any control system that reduces the torque by temporarily reducing the voltage or current input, or a device that temporarily alters how the motor is connected in the electric circuit.

Regardless, the soft starter are not available for high power application such as E-LNG plants. Therefore, the start up of a plant requires that each motor is provided with its own variable frequency drive.

BRIEF DESCRIPTION OF THE INVENTION

The requirement of a variable frequency drive for each electric motor of the plant forces to build a bigger plant to house such devices. Indeed, each high-power extends over a surface comprised approximately between 10 and 50 square meters. Also, since they are very complex machines, their presence considerably raises the costs of the plant.

One embodiment of the invention therefore relates to a method for starting and operating a plant for the liquefaction of a gaseous product. The plant comprises at least a first and a second machine string. Each string comprises an electrical motor and a load mechanically connected to the electric motor. The plant also comprises a variable frequency drive connected to a power supply grid having an its own frequency. The variable frequency drive is also associated to the electrical motors.

The method comprises the step of electrically connecting the variable frequency drive to the motor of the first machine string. The speed of the motor of the first machine string is then increased up until a first predefined threshold is reached. The first predefined threshold is function of said frequency of the power supply grid.

The variable frequency drive is electrically disconnected from the motor of the first machine string and electrically connected to the motor of the second machine string almost simultaneously. The speed of the motor of the second machine string is increased up until a second predefined threshold is reached.

Another embodiment also relates to a plant for the liquefaction of a gaseous product. The variable frequency drive of the plant is configured to be connected to each of the motors.

This allows to build a much smaller plant, because just a single variable frequency drive is needed.

BRIEF DESCRIPTION OF THE DRAWINGS

Further details and specific embodiments will refer to the attached drawings, in which.

DETAILED DESCRIPTION

Figure 1:
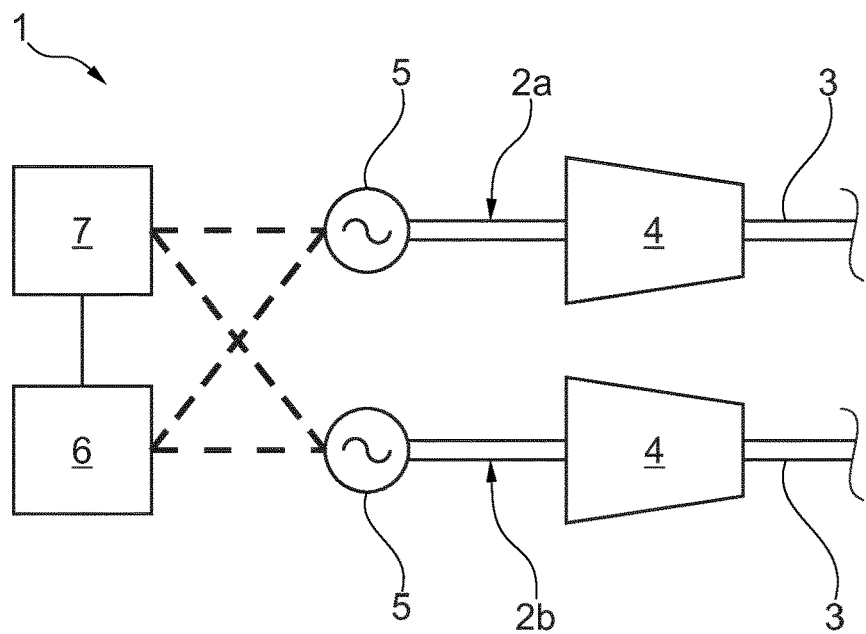
FIG. 1 is a schematic view of a plant for the liquefaction of a gaseous product.

The following description of exemplary embodiments refer to the accompanying drawings. The same reference numbers in different drawings identify the same or similar elements. The following detailed description does not limit the invention. Instead, the scope of in an embodiment defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached drawings, with the number 1 is indicated a plant for the liquefaction of a gaseous product.

The plant 1 comprises at least a first 2a and a second machine string 2b. The strings 2a, 2b each comprise a respective shaft 3 to which is connected a respective load 4. In the following part of the disclosure the machine strings 2a and 2b will be described as comprising substantially the same components. However it is understood that, depending on the specific process used in the plant, the first 2a and the second machine string 2b may comprise components of different kind or, alternatively, of the same kind but sized differently.

More in detail, a load 4 is attached to the shaft 3. Specifically, the load 4 is a driven machine, usually a compressor 4, which is attached to the shaft 3 in order to process a predetermine amount of refrigerant. The refrigerant can either be propane, ethylene, methane, mixed refrigerant or nitrogen. For example, a compressor of this kind has to process a flow rate comprised between 60000 m$^3$/h and 500000 m$^3$/h, depending on the specific application. This flow is compressed from 1.5-5 bar to 15-70 bar. It is to be noted that each string 2a, 2b can comprise any number of compressors 4, all connected to the same shaft 3.

To drive the compressors 4, each string 2a, 2b comprises an electrical motor 5 attached to the shaft 3. In the embodiment of the invention the motor 5 is the only power source for driving the shaft 3. In other embodiments, not shown in the drawing, another power source may be present, in particular a gas or steam turbine. The motor 5 may be of any kind suitable for the above described purpose which is commercially available. With more detail, in the configuration shown in FIG. 1 the motor 5 is a single end motor. In other words, each motor 5 is connected at an end section of the shaft 3.

Figure 3:
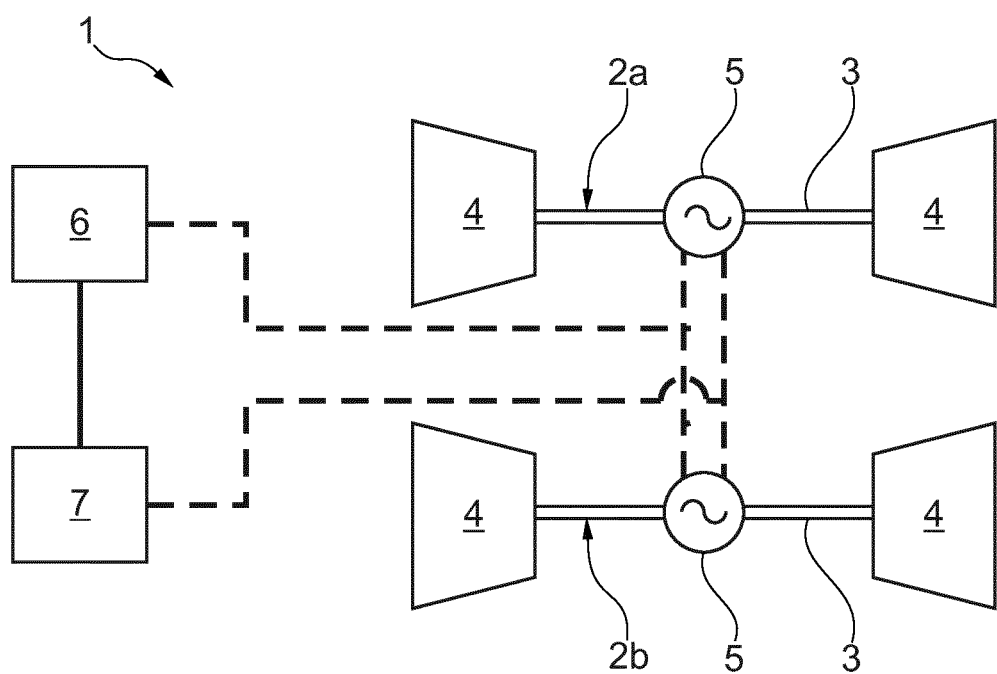
FIG. 3 is an alternative configuration of the plant of FIG. 1.

In the more general configuration shown in FIG. 3, the motor 5 is a double end motor. In other words, each motor 5 is connected at an intermediate section of the shaft 3. Thus it is possible to attach a compressor 4 on each side of the motor 5.

The plant 1 also comprises at least a variable frequency drive 6 associated with the electrical motors 5. The variable frequency drive 6 is configured to be connected to each of the motors 5. In the embodiment shown in the drawings, the plant 1 comprises only a single variable frequency drive 6. In other embodiments, not shown in the drawings, the plant 1 comprises a plurality of machine strings and, thus, a plurality of variable frequency drives 6. In this case, the number of the variable frequency drives 6 is less than the number of machine strings. It is to be noted that, in designing a specific instance of the plant 1, the variable frequency drive 6 is sized to provide power to just a single machine string 2a, 2b. For example, the number of variable frequency drives 6 can be one less of the number of machine strings 2a, 2b in the plant 1.

The plant 1 is also electrically connectable to a power supply grid 7. Specifically, the motors 5 are able to draw power from the power supply grid 7. The power supply grid 7, being the external electrical grid available on the site of each specific instance of the plant 1, is able to supply only a substantially constant frequency to the motor 5, thus driving it at substantially constant speed.

In the plant 1, the variable frequency drive (6) is configured to sequentially start-up the motors (5) of the first (2a) and a second machine string (2b) and to regulate the speed of one of said motors when both motors are started-up. The regulation of the speed allows to optimize the efficiency and operating conditions of the load of each string. In particular, when the machine stings are two, the speed of the motors are adjusted so to match the best operating conditions of the specific load/s installed on the respective machine string.

Figure 2A:
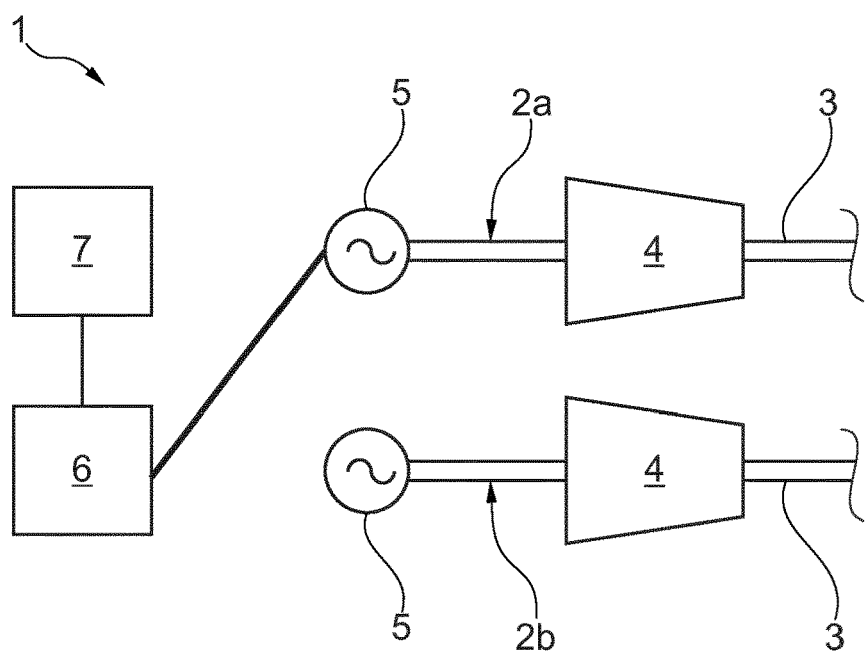
FIGS. 2a and 2b are schematic representation of respective steps of a method for starting and operating the plant of FIG. 1

The above described plant 1 can be started as follows. As shown in FIG. 2a, the variable frequency drive 6 is electrically connected first to the motor 5 of the first machine string 2a. The variable frequency drive 6 is then started, gradually increasing its voltage and/or frequency output. Consequently, the speed of the motor 5 of the first machine string 2a is also increased. This is continued up until a first predefined threshold is achieved. The first predefined threshold is function of the typical frequency of the power supply grid 7.

A power supply grid 7 is then directly connected to the motor 5 of the first machine string 2a, so that the first predefined threshold of speed is maintained. The power supply grid 7 is also electrically connected to the motor 5 of the second machine string 2b by means the variable frequency drive 6.

Therefore, powering the motor 5 of the first machine string 2a is then taken over by the power supply grid 7. Thus, the variable frequency drive 6 can be electrically disconnected from the motor 5 of the first machine string 2a.

With more detail, the step of electrically connecting the power supply grid 7 is performed before the step of electrically disconnecting the variable frequency drive 6 in order to guarantee a supply of energy to the motor 5.

Figure 2B:
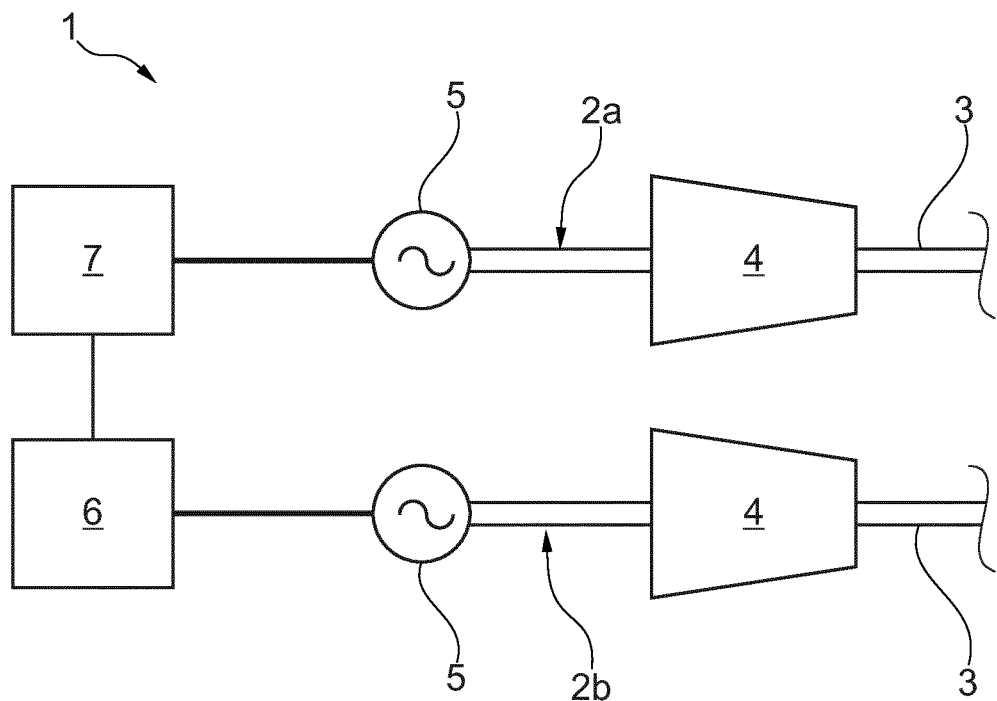

As is schematically shown in FIG. 2b, the variable frequency drive 6 is then electrically connected to the motor 5 of the second machine string 2b. The speed of the motor 5 of the second machine string 2b is then increased up until a second predefined threshold.

Indicatively, the first and the second predefined threshold can both be comprised between 1500 rpm and 5000 rpm, in an embodiment equal to 3600 or 3000, depending on the electricity grid which is used to power the motors 5. When the power supply grid has a frequency of 50 Hz the first predefined threshold is about 3000 rpm, while when the power supply grid has a frequency of 60 Hz the first predefined threshold is about 3600 rpm. The exact value of the first and of the second predefined thresholds however depends on other design consideration, which can be different in each instance of the plant 1. Also, the first and the second thresholds can be equal or can be different from each other. The first and the second predefined threshold should, in general, be suitable as a substantially constant speed of operation of the motors 5. The substantially constant speed coming from the substantially constant frequency of the power supply grid (7).

It is also to be noted that, after the plant 1 has been started, the variable frequency drive 6 can be used to regulate the speed of the motor 5 of the second machine string 2b, in particular when the second predefined threshold has been reached. In other words, the variable frequency drive 6 is used to adapt the capacity of the plant 1 depending on the required load of the compressors 4. When the variable frequency drive 6 is used to regulate the speed of the motor 5 of the second machine string 2b, the speed of the first machine string 2a is substantially maintained at a substantially constant speed, specifically the first predefined threshold.

Also, the variable frequency drive 6 and the power supply grid 7 can be switched between each of the motors 5. Thus, in principle, the variable frequency drive 6 can be used to regulate the speed of the motor 5 of the first machine string 2a. This capability can be used in case the second machine string 2b stops unexpectedly. In such condition, the variable frequency drives takes over the motor 5 of the first machine string 2a and, as soon as the trip condition is overcome, handles it back to the power supply grid 7 in order to restart the second machine string 2b in the manner described above.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A method for starting and operating a plant for the liquefaction of a gaseous product, the plant comprising at least a first and a second machine string, each string comprising a respective electrical motor mechanically connected to a respective load, the plant comprising a variable frequency drive connected to a power supply grid having an its own frequency and associable to the electrical motors, the method comprising the steps of:
   electrically connecting the variable frequency drive to the motor of the first machine string;
   increasing the speed of the motor of the first machine string up until a first predefined threshold is reached, wherein the first predefined threshold is a function of the frequency of the power supply grid;
   electrically disconnecting the variable frequency drive from the motor of the first machine string and electrically connecting the motor of the first machine string to the power supply grid;
   electrically connecting the variable frequency drive to the motor of the second machine string; and
   after the plant is started, regulating the speed of the motor of the second machine string by the variable frequency drive while maintaining the motor of the first machine string at a substantially constant speed at the first predefined threshold,
   wherein during a trip condition where the motor of the second machine string stops unexpectedly, the variable frequency drive is configured to reconnect to the motor of the first machine string to regulate the motor of the first machine string until the trip condition is overcome, and once the trip condition is overcome, the variable frequency drive is configured to disconnect from the motor of the first machine string and reconnect to the motor of the second machine string to restart the motor of the second machine string while the motor of the first machine string is reconnected to the power supply grid.

2. The method according to claim 1, wherein the step of electrically connecting the power supply grid is performed substantially at the same time of the step of electrically disconnecting the variable frequency drive.

3. The method according to claim 1, wherein the steps of electrically disconnecting the variable frequency drive from the motor of the first machine string and electrically connecting the variable frequency drive to the motor of the second machine string occur simultaneously.

4. The method according to claim 1, wherein the step of regulating the speed of the motor of the second machine string is performed after a speed of the motor of the second machine string reaches a second predefined threshold.

5. The method according to claim 4, wherein the first predefined threshold is equal to the second predefined threshold.

6. The method according to claim 1, wherein the variable frequency drive and the power supply grid can be switched between each of the motors.

7. The method according to claim 1, wherein the first predefined threshold is comprised between 1500 rpm and 5000 rpm.

8. The method according to claim 1, wherein the first predefined threshold is equal to 3000 rpm when the power supply grid has a frequency of 50 Hz or to 3600 rpm when the power supply grid has a frequency of 60 Hz.

9. A plant for the liquefaction of a gaseous product comprising:
   at least a first and a second machine string, each string comprising a respective electrical motor mechanically connected to a respective load; and
   a variable frequency drive connectable to a power supply grid having its own frequency and associated with the electrical motors, the variable frequency drive configured to be electrically connected to each of the motors and to sequentially start-up the motors of the first and a second machine string and to regulate the speed of each of the motors;
   the plant configured so that (i) the variable frequency drive increases a speed of the motor of the first machine string up until a first predefined threshold is reached, the first predefined threshold being a function of the frequency of the power supply grid, (ii) the motor of the first machine string is then disconnected from the variable frequency drive and connected to the power grid, (iii) the variable frequency drive regulates the speed of the motor of the second machine string, and (iv) after the plant is started, the motor of the first machine string is maintained at a substantially constant speed at the first predefined threshold when the variable frequency drive regulates the speed of the motor of the second machine string, wherein during a trip condition where the motor of the second machine string stops unexpectedly, the variable frequency drive is configured to reconnect to the motor of the first machine string to regulate the motor of the first machine string until the trip condition is overcome, and once the trip condition is overcome, the variable frequency drive is configured to disconnect from the motor of the first machine string and reconnect to the motor of the second machine string to restart the motor of the second machine string while the motor of the first machine string is reconnected to the power supply grid.

10. The plant according to claim 9, wherein the variable frequency drive is configured to regulate the speed of the motor of the second machine string after a speed of the motor of the second machine string reaches a second predefined threshold.

11. The plant according to claim 9, wherein the plant comprises only one variable frequency drive.

12. The plant according to claim 9, wherein the plant comprises a plurality of the machine strings and a plurality of variable frequency drives, the number of the variable frequency drives being less than the number of the machine strings.

13. The plant according to claim 9, wherein the power supply grid is directly connectable with one or more of the motors.

14. The plant according to claim 9, wherein the variable frequency drive is sized to provide power to a single machine string.

15. The plant according to claim 9, wherein each of the motors is connected to the respective load by a respective shaft, each of the motors being connected at an intermediate section or at an end section of the respective shaft.

16. The method according to claim 1, wherein the load for each of the motors is a compressor configured to process a fluid flow rate a flow rate between 60000 m3/h and 500000 m3/h.

17. The plant according to claim 9, wherein the respective load for each of the motors is a compressor configured to process a fluid flow rate a flow rate between 60000 m3/h and 500000 m3/h.

* * * * *